US010198758B2

(12) United States Patent
Qian

(10) Patent No.: US 10,198,758 B2
(45) Date of Patent: Feb. 5, 2019

(54) GUIDE ROBOT FOR SHOPPING GUIDING SYSTEM AND METHOD

(71) Applicant: Ecovacs Robotics, Inc., Canton, OH (US)

(72) Inventor: Dongqi Qian, Glendale, CA (US)

(73) Assignee: ECOVACS ROBOTICS, INC., Canton, OH (US)

( * ) Notice: Subject to any disclaimer, the term of this patent is extended or adjusted under 35 U.S.C. 154(b) by 733 days.

(21) Appl. No.: 14/229,288

(22) Filed: Mar. 28, 2014

(65) Prior Publication Data

US 2015/0278889 A1 Oct. 1, 2015

(51) Int. Cl.
*G06Q 30/00* (2012.01)
*G06Q 30/06* (2012.01)

(52) U.S. Cl.
CPC ..... *G06Q 30/0601* (2013.01); *G06Q 30/0641* (2013.01)

(58) Field of Classification Search
CPC ................. G06Q 30/0631; G06Q 30/0641
USPC ................................... 705/26.1, 27.1
See application file for complete search history.

(56) References Cited

U.S. PATENT DOCUMENTS

| 7,014,102 B2 | 3/2006 | Oohashi |
| 7,769,203 B2 | 8/2010 | Oohashi et al. |
| 8,996,429 B1* | 3/2015 | Francis, Jr. ............ G06N 3/008 706/12 |
| 2005/0222712 A1 | 10/2005 | Orita |
| 2007/0192910 A1* | 8/2007 | Vu ........................ B25J 5/007 700/245 |
| 2008/0232651 A1 | 9/2008 | Woo |
| 2012/0316676 A1 | 12/2012 | Fouillade et al. |

OTHER PUBLICATIONS

Lin Chao-Yu, et al., User identification design by fusion of face recognition and speaker recognition, 2012, IEEE (Year: 2012).*
Roning Juha, et al., Minotaurus: A System for Affective Human-Robot Interaction in Smart Environments, Jan. 1, 2014, Springer New York, LLC. (Year: 2014).*
International Search Report and Written Opinion for PCT/US2015/020334 dated Jun. 11, 2015 (19 pages).

* cited by examiner

*Primary Examiner* — Brittney N Miller
(74) *Attorney, Agent, or Firm* — K&L Gates LLP

(57) ABSTRACT

An intelligent shopping guiding system comprising a guide robot and a workstation computer is disclosed. The guide robot is coupled to the workstation computer, preferably over a wireless system and information between the guide robot and the workstation computer is transferred via wireless communication. As the front-end equipment of the shopping guiding system, the guide robot interacts with the customer and provides assistance and guidance to the customer to enhance their shopping experience. As the back-end equipment of the shopping guiding system, the workstation computer builds, stores, and maintains a customized message associated with a customer's unique ID number. The unique ID number is associated with the customer's personal characteristics such as, for example, biometric information, physiological, or other information suitable for identifying the customer.

17 Claims, 9 Drawing Sheets

GUIDE ROBOT FOR SHOPPING GUIDING SYSTEM AND METHOD

BACKGROUND

The present disclosure relates generally to a shopping system comprising a guide robot and a workstation computer. More particularly, the present disclosure is related to a shopping guide system comprising a guide robot coupled to a workstation computer or multiple guide robots coupled to the workstation computer. Still more particularly, the present disclosure is related to a shopping system comprising multiple personal shopping guide robots coupled to multiple workstation computers, which are coupled to a wide area network.

Robots for industrial, retail, office, and personal use have been developed which are used to perform many useful activities. Some robots have been developed to guide an unguided person to a destination in an office. Such robots can perform intuitive interaction with one or more persons and may be configured to greet a person, provide answers to basic questions, and may even accompany a person to a destination. Such robots may employ visual perception, sound source localization, and/or speech recognition to interact with people.

Other guide robots are configured to provide information to a customer about goods and services available at a store and/or answer specific inquiries from the customer. At present, however, no records are kept by the guide robot of its interaction with the customer or of the customer's individual shopping preference. Therefore, there is no mechanism to provide customized service or shopping guidance to the customer on their next visit to the store.

Accordingly, despite recent advances, there is a need for an improved shopping system comprising a personal guide robot and workstation computer working together to create and maintain a database of information associated with an individual customer's shopping preferences and tendencies. The improved shopping system can then use the information in the database to recognize an individual customer and better assist the customer in their shopping experience.

SUMMARY

In one embodiment, the present disclosure provides a method of guiding shopping by a guide robot. The method comprises abstracting, by an individual personal characteristic unit of a guide robot, personal characteristics information associated with a customer; sending, by a communication unit of the guide robot, the abstracted personal characteristics information associated with the customer to a remote workstation computer; receiving, by the communication unit of the guide robot, a customized message associated with the customer from the remote workstation computer; and presenting, by a user interface of the guide robot, the customized message to the customer.

In another embodiment, the present disclosure provides a method of guiding shopping by a workstation computer. The method comprises receiving, by a communication unit of a workstation computer, abstracted personal characteristics information from a remote guide robot; and comparing, by a message processing unit of the workstation computer, the received abstracted personal characteristics information to a plurality of personal characteristics information stored in a database coupled to the workstation computer; wherein when there is matching personal characteristics information stored in the database, retrieving a customer message associated with a customer identification number from the database.

In another embodiment, the present disclosure provides a guide robot for a shopping guiding system, the robot comprises a control unit; an individual personal characteristic unit coupled to the control unit, the individual personal characteristic unit configured to abstract personal characteristics information associated with a customer; a communication unit coupled to the control unit, the communication unit configured to send the abstracted personal characteristics information associated with the customer to a remote workstation computer and to receive a customized message associated with the customer from the remote workstation computer; and a user interface coupled to the control unit, the user interface configured to present the customized message to the customer.

In another embodiment, the present disclosure provides a workstation computer for a shopping guiding system. The workstation computer comprises a communication unit configured to receive an abstracted personal characteristics information from a remote guide robot; a database; and a message processing unit coupled to the communication unit, the message processing unit configured to compare the received abstracted personal characteristics information to a plurality of personal characteristics information stored in the database; wherein the message processing unit is configured to retrieve a customer message associated with a customer identification number from the database when there is matching personal characteristics information stored in the database.

In another embodiment, the present disclosure provides a shopping guiding system. The shopping guiding system comprises a first workstation computer and a second message processing unit. The first workstation computer comprises a first communication unit configured to receive an abstracted personal characteristics information from a remote guide robot; a first database; and a first message processing unit coupled to the first communication unit, the first message processing unit configured to compare the received abstracted personal characteristics information to a plurality of personal characteristics information stored in the first database; wherein the first message processing unit is configured to retrieve a customer message associated with a customer identification number from the first database when there is matching personal characteristics information stored in the first database. The second workstation computer comprises a second communication unit configured to receive an abstracted personal characteristics information from the remote guide robot; a second database; and a second message processing unit coupled to the second communication unit, the second message processing unit configured to compare the received abstracted personal characteristics information to a plurality of personal characteristics information stored in the second database; wherein the second message processing unit is configured to retrieve a customer message associated with a customer identification number from the second database when there is matching personal characteristics information stored in the second database.

In addition to the foregoing, various other aspects of devices and/or processes are set forth and described in the teachings such as text (e.g., claims and/or detailed description) and/or drawings of the present disclosure.

The foregoing is a summary and thus may contain simplifications, generalizations, inclusions, and/or omissions of detail; consequently, those skilled in the art will appreciate that the summary is illustrative only and is NOT intended to be in any way limiting of the claimed subject matter. Other aspects, features, and advantages of the devices and/or processes and/or other subject matter described herein will become apparent in the teachings set forth herein.

In one or more various aspects, related systems include but are not limited to circuitry and/or programming for effecting herein-referenced method aspects; the circuitry and/or programming can be virtually any combination of hardware, software, and/or firmware configured to effect the herein-referenced method aspects depending upon the design choices of the system designer. In addition to the foregoing, various other method and/or system aspects are set forth and described in the teachings such as text (e.g., claims and/or detailed description) and/or drawings of the present disclosure.

The foregoing summary is illustrative only and is not intended to be in any way limiting. In addition to the illustrative aspects, embodiments, and features described above, further aspects, embodiments, and features will become apparent by reference to the drawings and the following detailed description.

FIGURES

The novel features of the embodiments described herein are set forth with particularity in the appended claims. The embodiments, however, both as to organization and methods of operation may be better understood by reference to the following description, taken in conjunction with the accompanying drawings as follows.

DESCRIPTION

Figure 1:
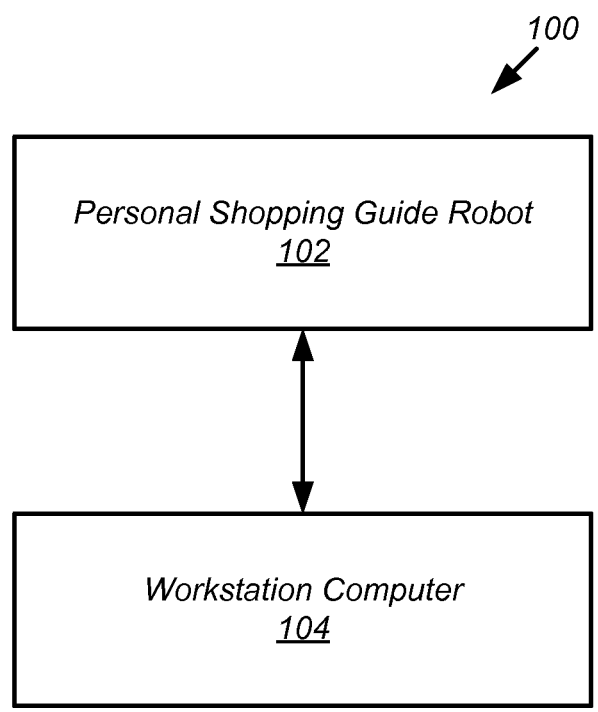
FIG. 1 is a diagram of an intelligent shopping guiding system comprising a guide robot and a workstation computer in accordance with one embodiment.

In the following detailed description, reference is made to the accompanying drawings, which form a part hereof. In the drawings, similar symbols and reference characters typically identify similar components throughout the several views, unless context dictates otherwise. The illustrative embodiments described in the detailed description, drawings, and claims are not meant to be limiting. Other embodiments may be utilized, and other changes may be made, without departing from the scope of the subject matter presented here.

Before explaining various embodiments of autonomous planar surface cleaning robots in detail, it should be noted that the various embodiments disclosed herein are not limited in their application or use to the details of construction and arrangement of parts illustrated in the accompanying drawings and description. Rather, the disclosed embodiments may be positioned or incorporated in other embodiments, variations and modifications thereof, and may be practiced or carried out in various ways. Accordingly, embodiments of autonomous planar surface cleaning robots disclosed herein are illustrative in nature and are not meant to limit the scope or application thereof. Furthermore, unless otherwise indicated, the terms and expressions employed herein have been chosen for the purpose of describing the embodiments for the convenience of the reader and are not to limit the scope thereof. In addition, it should be understood that any one or more of the disclosed embodiments, expressions of embodiments, and/or examples thereof, can be combined with any one or more of the other disclosed embodiments, expressions of embodiments, and/or examples thereof, without limitation.

Also, in the following description, it is to be understood that terms such as front, back, inside, outside, top, bottom, left, right, and the like are words of convenience and are not to be construed as limiting terms. Terminology used herein is not meant to be limiting insofar as devices described herein, or portions thereof, may be attached or utilized in other orientations. The various embodiments will be described in more detail with reference to the drawings.

In one embodiment, the present disclosure provides a shopping guiding system comprising a guide robot coupled to a workstation computer. The guide robot is configured to provide individual customized shopping service assistance to a customer based on the individual customer's shopping preferences or tendencies and any specific targeted inquiries from the customer. The guide robot and the workstation computer work together to create and maintain a database that includes records used to identify a customer and provide a targeted message to the customer that is based on a history of the individual customer's interests, tendencies, purchasing habits, etc. Accordingly, when the individual visits the store another time, the guide robot can quickly and efficiently recognize the customer, retrieve a personalized message, and deliver a customized message to assist the customer with their shopping experience. In addition, the guide robot and the workstation computer will obtain additional information from the customer based on the current interaction such as, the individual's current interests and any new inquiries, to update the customized message.

In one embodiment, the present disclosure provides a shopping guiding system. The system comprises at least a shopping guide robot coupled to a workstation computer having access to a database. The shopping guiding system is configured to establish an exclusive identification (ID) number for each individual that interacts with the guide robot and/or the workstation computer. The exclusive individual ID number is associated with the individual's personal characteristics abstracted by the guide robot. Thus, when the individual visits the store another time, or visits another store with a functional guide robot capability, the shopping guiding system recognizes the customer and ID number and retrieves a customized message associated with the ID number from the database and delivers the message to the individual to enhance the individual's personal shopping experience. In the meantime, any additional information garnered during the current interaction is used to update the customized message.

In another embodiment, the present disclosure is directed to a shopping guiding system comprising a network of multiple workstation computers. The workstation computers are connected via a wide area network, such as the Internet or the cloud, and can transfer the customized messages associated with the individual's ID number via the network to enhance the individual's personal shopping experience.

In various embodiments, the present disclosure provides a shopping guiding system. The shopping guiding system comprises a guide robot and a workstation computer. The guide robot connects to the workstation computer via wireless communication, although wired communication techniques are contemplated to be within the scope of the present disclosure. When a customer visits a store for the first time, the guide robot and the workstation cooperate to enroll the new customer by establishing a personal ID number based on the customer's outward characteristics such as biometric information. The customer's ID number is then associated with a customized message associated with the customer's shopping preferences and tendencies. When an enrolled customer visits the store another time, the guide robot is configured to identify the customer by acquiring personal characteristic information associated with the customer, deliver a customized message to the customer, and update the customized message based on the current interaction.

In particular, when a customer visits a store, the guide robot acquires personal characteristic information associated with the customer and transfers the personal characteristic information to the workstation computer via wireless communication. The workstation computer compares the personal characteristic information with personal characteristic information stored in a database. When there is no match, the workstation computer generates a unique customer identification (ID) number and set up a database with information about the new customer and begins to build a customized message. When a match occurs, the workstation computer retrieves a customized message associated with the customer's unique ID. The customized message is used to provide personal shopping service assistance to the customer.

With reference now to FIG. 1, there is illustrated a diagram of an intelligent shopping guiding system 100 comprising a guide robot 102 and a workstation computer 104 in accordance with one embodiment. In the intelligent shopping guiding system 100 shown in FIG. 1, the guide robot is coupled to the workstation computer. Preferably the guide robot and the workstation computer are coupled over a wireless system and information between the guide robot 102 and the workstation computer 104 is transferred via wireless communication. In some embodiments, however, the guide robot and the workstation computer may be coupled over a wired system. As the front-end equipment of the shopping guiding system 100, the guide robot 102 interacts with the customer and provides assistance and guidance to the customer to enhance their shopping experience. As the back-end equipment of the shopping guiding system 100 the workstation computer 104 builds, stores, and maintains a customized message associated with a customer's unique ID number. The unique ID number is associated with the customer's personal characteristics such as, for example, biometric information, physiological, or other information suitable for identifying the customer.

Figure 2:
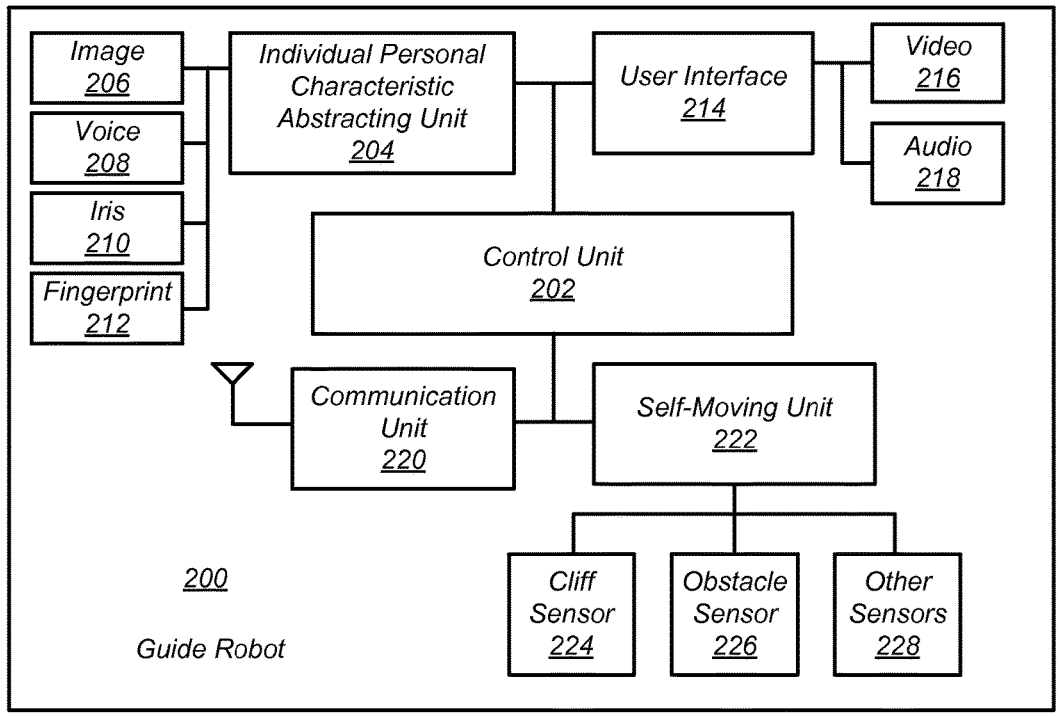
FIG. 2 is a simplified block diagram of a guide robot suitable for use in the intelligent shopping guiding system of FIG. 1 in accordance with one embodiment.

FIG. 2 is a simplified block diagram of a guide robot 200 suitable for use in the intelligent shopping guiding system 100 (FIG. 1) in accordance with one embodiment. In one embodiment, the guide robot 200 comprises a control unit 202 operatively coupled to a guiding server unit referred to as a user interface 214, an individual personal characteristic abstracting unit 204, a communication unit 220, and a self-moving unit 222.

The user interface 214 is coupled to a video screen display 216 and/or an audio device 218. The guide robot 200 can communicate with a customer visually through the video screen display 216 and/or audibly through an audio interface 218. The video screen display 216 can display text or graphical information to the customer and may be configured with touchscreen technology to receive input from the customer. The audio device 218 may comprise speakers and or microphones to communicate with the customer. Voice recognition technology may be employed to receive input from the customer.

The guide robot 200 further comprises an individual personal characteristic abstracting unit 204. The abstracting unit 204 is operatively coupled to one or more biometric systems comprising an image acquisition system 206, a voice recognition system 208, an iris detection system 210, and/or a fingerprint recognition system 212. The abstracting unit 204 is configured to acquire a customer's personal characteristics, which can be used to establish an identity for a new customer or to identify an enrolled customer on a repeat visit to the store. The image acquisition system 206 comprises a charge coupled device (CCD) based image sensor to capture an image of an individual's face. The image is used by other system components to generate a template, which is stored in a database. A subsequent captured image of the individual's face is compared with the stored template to identify the face. The voice recognition system 208 is configured to frequently analyze the individual's voice. The iris detection system 210 can be used to distinguish the individual's iris and fingerprint recognition system 212 is used for capturing and recognizing the individual's fingerprints, for example. These biometric systems can be used either alone or together to capture the individual's characteristics, which are employed by the shopping guiding system to assign a unique ID number to the individual based on the individual's characteristics.

The guide robot 200 further comprises a communication unit 220 to communicate with a remote workstation computer, other guide robots, and/or a wide area network, such as the Internet or the Cloud. In the embodiment illustrated in FIG. 2, the communication unit 220 comprises wireless radio communications functionality. After the individual's personal characteristic information is abstracted, the control unit 202 controls the wireless communication unit 220 to send this information to the workstation computer 300, as described in more detail hereinbelow.

Furthermore, for the individual customer's convenience, the guide robot 200 is self-movable and comprises a self-moving unit 222. To avoid danger while the guide robot 200 is moving, the guide robot 200 further comprises one or more some cliff sensors 224, obstacle sensors 226, or other sensors 228.

The control unit 202 may comprise one or more processors (e.g., microprocessor, microcontroller) coupled to the customer personal characteristics abstracting unit 204, which is coupled to various sensors associated with the image acquisition system 206, voice recognition system 208, iris recognition system 210, and/or fingerprint recognition system 212. In addition, to the processor(s), a storage (having operating logic) and a communication interface, are coupled to each other.

The processor may be configured to execute the operating logic. The processor may be any one of a number of single or multi-core processors known in the art. The storage may comprise volatile and non-volatile storage media configured to store persistent and temporal (working) copy of the operating logic.

In various embodiments, the operating logic may be configured to process the collected biometric associated with motion data of the user, as described above. In various embodiments, the operating logic may be configured to perform the initial processing, and transmit the data to the computer hosting the application to determine and generate instructions on the visual and/or tactile feedback to be provided. For these embodiments, the operating logic may be further configured to receive the biometric data associated with the customer. In alternate embodiments, the operating logic may be configured to assume a larger role in receiving the biometric data. In either case, whether determined on its own or responsive to instructions from a hosting computer, the operating logic may be further configured to control the operation of the customer personal characteristic abstraction unit 204, the user interface 214, the communication unit 220, and the self-moving unit 222.

In various embodiments, the operating logic may be implemented in instructions supported by the instruction set architecture (ISA) of the processor, or in higher level languages and compiled into the supported ISA. The operating logic may comprise one or more logic units or modules. The operating logic may be implemented in an object oriented manner. The operating logic may be configured to be executed in a multi-tasking and/or multi-thread manner. In other embodiments, the operating logic may be implemented in hardware such as a gate array.

In various embodiments, the communication interface may be configured to facilitate communication between a peripheral device and the computing system. The communication may include transmission of the collected biometric data to a hosting computer. In various embodiments, the communication interface may be a wired or a wireless communication interface. An example of a wired communication interface may include, but is not limited to, a Universal Serial Bus (USB) interface. An example of a wireless communication interface may include, but is not limited to, a Bluetooth interface.

For various embodiments, the processor may be packaged together with the operating logic. In various embodiments, the processor may be packaged together with the operating logic to form a System in Package (SiP). In various embodiments, the processor may be integrated on the same die with the operating logic. In various embodiments, the processor may be packaged together with the operating logic to form a System on Chip (SoC).

The individual personal characteristic information may be acquired or captured by the guide robot 200 using a variety of techniques. For example, the guide robot 200 may employ token-based identification techniques, such as a driver's license or passport, knowledge-based identification techniques, such as a password or personal identification number, or more preferably, biometric based identification techniques. Since biometric identifiers are unique to individuals, they can be more reliable in verifying identity than token and knowledge-based techniques. Biometric identification (or biometric authentication) refers to the identification of individuals by their characteristics or traits. Biometric identification can be used in computerized processes such as the shopping guiding system 100 (FIG. 1) as a way of identifying individual customers.

Biometric identifiers are distinctive measurable characteristics and can be used to label and describe individual customers. Biometric identifiers can be categorized as physiological characteristic related to the shape of a person's body. Such measurable physiological characteristics may include, without limitation, face recognition using the image acquisition system 206, voice recognition system 208, iris recognition system 210, fingerprint recognition system 212, DNA, palm print, hand geometry, retina, and odor/scent, among others. Biometric identifiers can also be related to behavioral characteristics such as the pattern of behavior of a person, including without limitation, typing rhythm and gait.

Other physiologic data may be used by the guide robot 200 to confirm the identity of an individual. Such other physiologic data may include, for example, heart rate, heart rate variability, respiration rate, body temperature, temperature of local environment, three-axis measurement of activity and torso angle, as well as other physiologic data, metrics, and indicators associated with one or more individuals.

Figure 3:
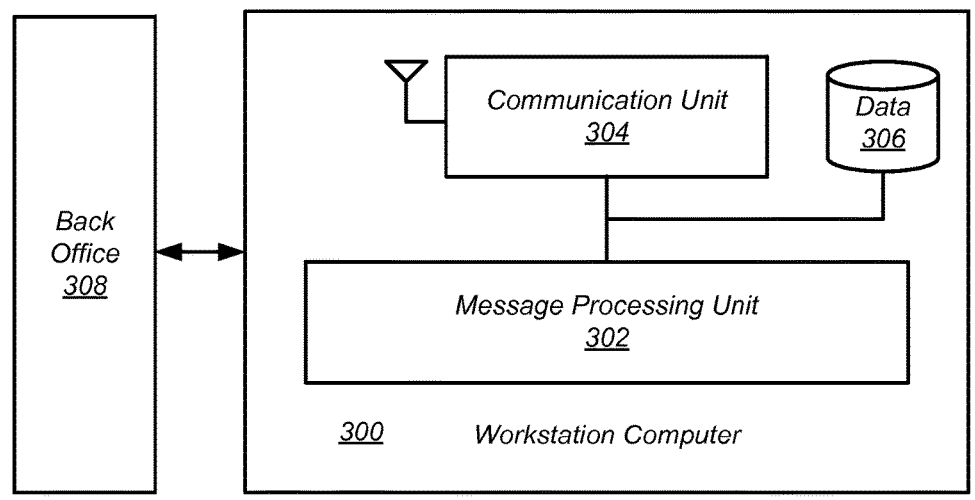
FIG. 3 is a simplified block diagram of a workstation computer in accordance with one embodiment.

FIG. 3 is a simplified block diagram of a workstation computer 300 in accordance with one embodiment. The workstation computer 300 comprises a message processing unit 302, a communication unit 304, and an information database 306. The workstation computer 300 is in communication with a back office 308, either by wireless or wired communication means. With reference now to both FIGS. 2 and 3, after the communication unit 304 of the workstation computer 300 receives the customer's individual personal characteristic information from the guide robot 200, the message processing unit compares the individual personal characteristic information with other individual personal characteristic information stored in the database 308.

If the workstation computer 200 confirms that the database 308 does not contain a match, the workstation computer 200 will set a new ID number for the individual and associate the ID number with the customer's individual personal characteristic information captured by the individual personal characteristic abstracting unit 204. The new ID number may be automatically generated by the workstation computer 200 or may be supplied by back office 308 staff. The back office 308 staff builds the customized message file under the new ID and stores it in the database 306. While the guide robot 200 is providing the shopping guidance or afterwards, the back office 308 staff compiles the customer's individual information about the classes of goods they are interested in or the goods they desire or have a need for, etc. The back office 308 staff stores the customized message file in the database 306.

On the other hand, if the workstation computer 300 confirms that the present database 306 contains a match, the workstation computer 300 will retrieve a customized message associated with the individual's ID number. The customized message is then analyzed either by the workstation computer 300 or by a person in the back office 308. The back office 308 staff controls the guide robot 200 to accomplish the shopping assistance in accordance with the results of the analyses. The customized message includes a variety of information such as customer interests, purchasing record, behavior, tendencies, or inquiries, among others. After the staff retrieves and analyzes the individual's customized message, the staff controls the guide robot 200 to undertake the shopping assistance service efficiently. During and/or after the shopping assistance, the staff updates the customer's individual customized message with newly obtained information and stores the updated customized message in the database. The updated customized message will be retrieved on the individual's next encounter with the guide robot 200.

The communication units 220, 304 in each of the guide robot 200 and the workstation computer 300 comprise wireless radio communications functionality to facilitate both local and wide area network (WAN) connectivity between the guide robot 200, the workstation computer 300, other guide robots, other workstation computers, and remote databases for example. Current wireless network options include WAN wireless transmission across private or public cellular network (i.e., GSM EDGE, HSDPA or CDMA-EVDO Rev. 0/Rev. A), with or without data security achieved via encrypted VPN technology, local area connectivity such as devices that incorporate integrated Wi-Fi and Bluetooth antennas for longer-range wireless local area network (WLAN), and short-range personal area network (PAN) connections, respectively. Cellular or Wi-Fi are the preferred modes of wireless communication where sensitive data is being exchanged, because it is not possible to encrypt Bluetooth® transmissions to a government-certified level. Wi-Fi is a particularly flexible option since it allows connectivity with remote databases via both public and private Wi-Fi hotspots, as well as Wi-Fi enabled laptops. The latter are able to store a local database, or act as a relay by using an external modem to transmit over the WAN via a cellular network. Transmissions can be encrypted using VPN technology.

Having described one embodiment of a guide robot 200 and a workstation computer 300, with reference to FIGS. 1-3, the present disclosure now turns to a brief description of a method of capturing the customer's individual characteristic information and establishing an exclusive ID number for each customer that interacts with the guide robot 200. Accordingly, during a customer's first encounter with the guide robot 200, the shopping guiding system 100 enrolls a new customer using biometric information. The customer's biometric information is captured by the individual personal characteristic abstracting unit 204 and wirelessly transmitted to the workstation computer 300 by the wireless communication unit 220. The captured information is processed by the workstation computer 300 to set a new ID number for the customer and stores the captured information in the database 306. On the next encounter with the guide robot 200, the biometric information will be captured and compared with the biometric information stored in the database 306 at the time of enrollment.

The first time a customer encounters the guide robot 200, a biometric sample of the customer is obtained by the individual personal characteristic abstracting unit 204. During the enrollment process, the captured biometric sample information is stored in the database 306. In subsequent encounters, a new biometric sample of the customer is obtained and compared with biometric samples stored in the database at the time of enrollment. Primarily, the biometric sample is an image of the customer's face captured by an image acquisition system 206. The biometric samples may be obtained by other techniques, such as, the voice recognition system 208, the iris recognition system, 210, and/or the fingerprint recognition system 212.

During the enrollment phase, the biometric sample is simply stored in the database 306. During the matching phase, the newly obtained biometric sample is passed to a matcher that compares it with existing biometric samples stored in the database 306. The difference between them can be estimated using any suitable algorithm (e.g., Hamming distance). The matching program will analyze the template with the input.

Figure 4:
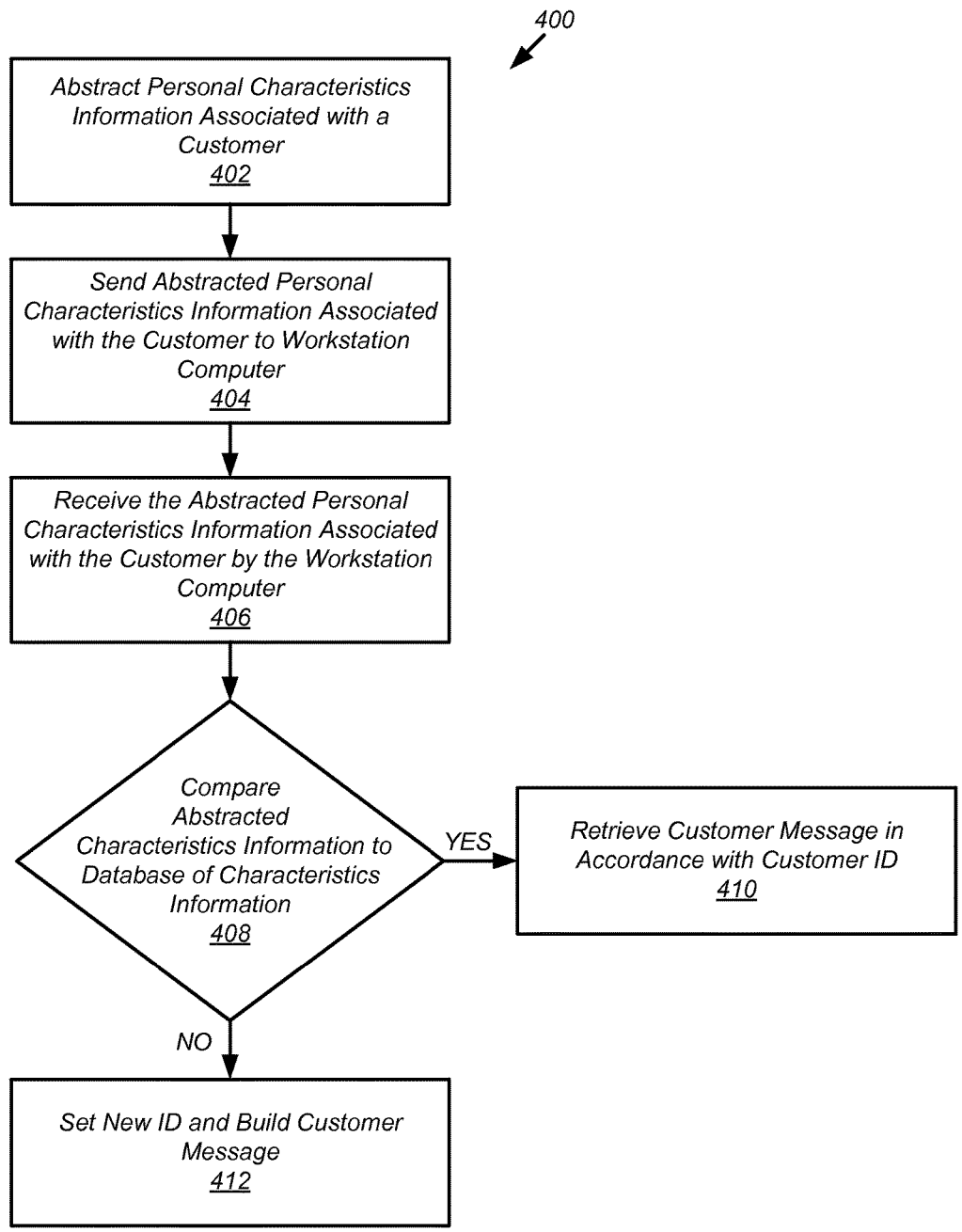
FIG. 4 is a logic diagram of a method of determining a customer characteristic in accordance with one embodiment.

FIG. 4 is a logic diagram of a method 400 of abstracting individual customer characteristics and comparing them in accordance with one embodiment. With reference to FIGS. 2-4, at 402, the individual personal characteristic abstracting unit 204 abstracts personal characteristics information associated with a customer, as previously described. At 404, the control unit 202 controls the communication unit 220 to send the abstracted personal characteristics information associated with the customer to the workstation computer 300. Although primarily the biometric sample is obtained by the image acquisition system 206, the biometric sample can be obtained by the voice recognition system 208, an iris recognition system, 210, and/or a fingerprint recognition system 212.

At 406, the abstracted personal characteristics information associated with the customer is received by the communication unit 304 of the workstation computer 300. At decision block 408, the message processing unit 302 compares the received abstracted personal characteristics information associated with the customer with a plurality of personal characteristics associated with a plurality of customers stored in the database 306 in an effort to identify a match.

When no match is found, the process 400 proceeds along the NO branch. At 412, the message processing unit 302 sets a new ID number for the new customer, builds a new customer message, and associates the customer message with the customer ID number. The new customer message is based on the current shopping experience. The new customer ID number may be automatically generated by the workstation computer 300 or may be issued by the back office 308 staff. The back office 308 staff builds the new customer message under the new ID number. During the shopping guiding service or after the service, the staff completes the information about the types of goods or services that the customer is interested in and stores the new message in the database 306.

When a match is found, the process 400 proceeds along the YES branch. At 410, the message processing unit 302 retrieves a customer message from the database 306 in accordance with the customer ID number.

Figure 5:
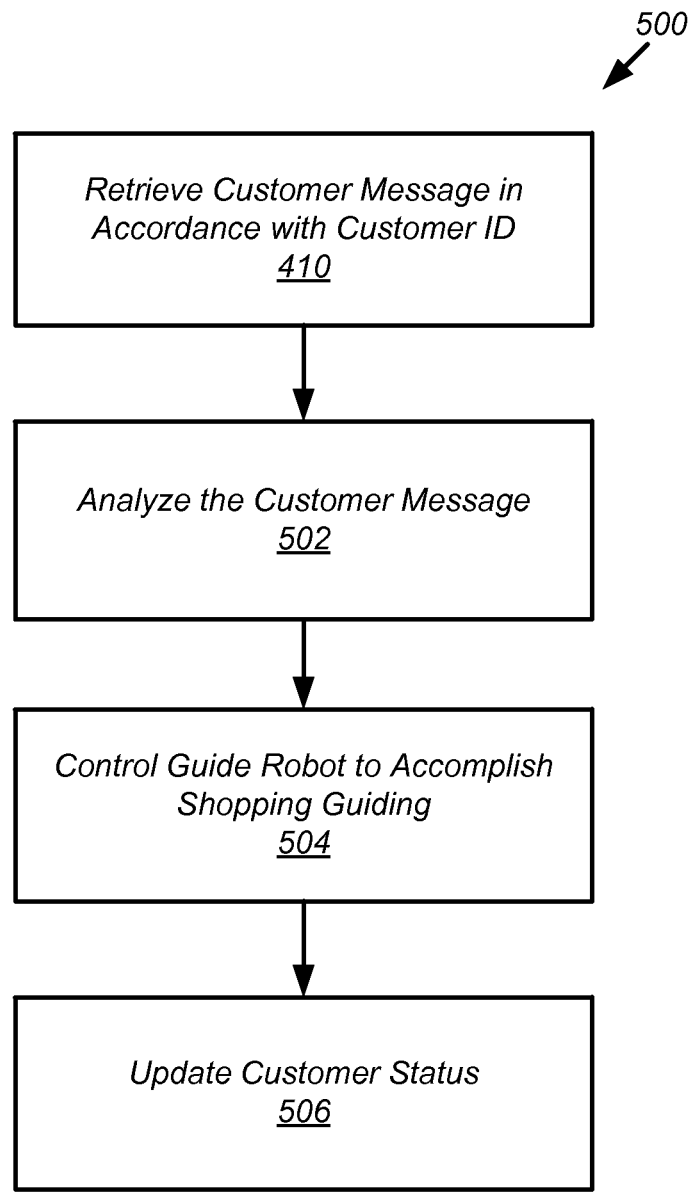
FIG. 5 is a logic diagram of a method of analyzing and updating a customer characteristic message in accordance with a customer identification number in accordance with one embodiment.

Turning now to FIG. 5, there is shown a logic diagram of a method 500 of analyzing and updating a customer message in accordance with a customer identification number in accordance with one embodiment. With reference now to FIGS. 2-5, when a match is found between the received abstracted personal characteristics information associated with the customer and a plurality of customer characteristics information stored in the database 306, at 410, the message processing unit 302 retrieves the customer message associated with the customer ID number from the database 306. At 502, the retrieved customer message is analyzed either by the workstation computer 300 or a staff person in the back office 308. At 504, the back office 308 staff controls the guide robot 200 to accomplish the shopping guidance in accordance with the results of the analysis. During the shopping guiding service or thereafter, at 506, the staff updates the individual customer's status. The message analysis at 502 includes a variety of information, such as customer interest, purchasing record etc. After the back office 308 staff learns the individual customer's message the staff controls the guide robot 200 to accomplish the shopping guiding service efficiently.

Figure 6:
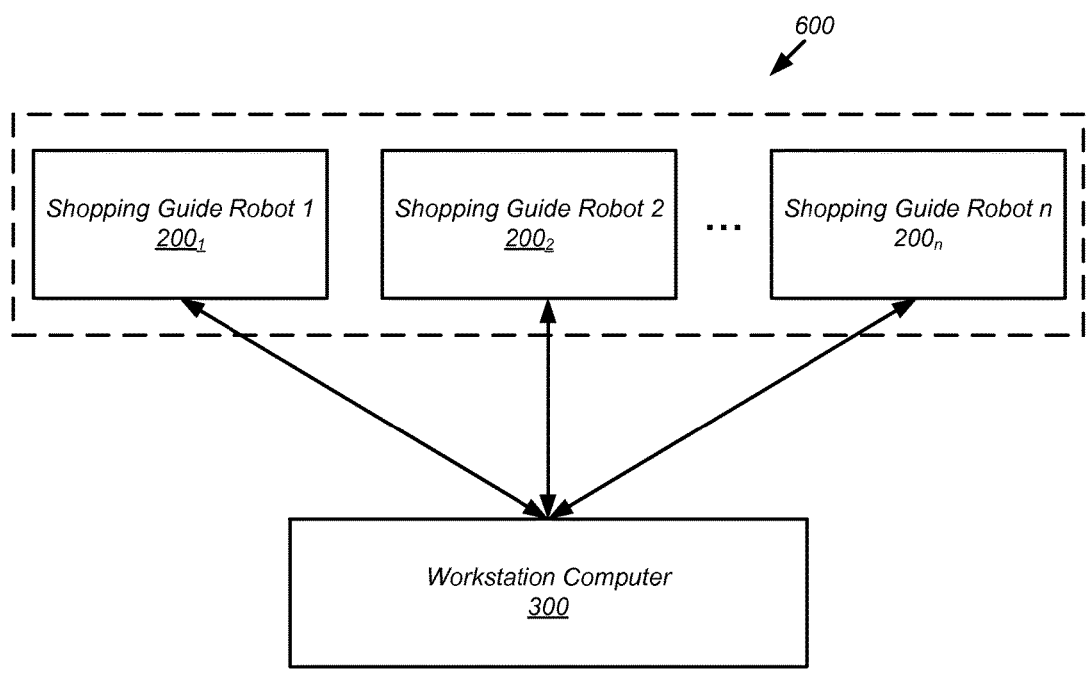
FIG. 6 is a diagram of an intelligent shopping guiding system comprising multiple guide robots coupled to a workstation computer in accordance with one embodiment.

FIG. 6 is a diagram of an intelligent shopping guiding system 600 comprising multiple guide robots $200_1$, $200_2$, $200_n$ coupled to a workstation computer 300 in accordance with one embodiment. As the front-end equipment of the guiding shopping system 600, each guide robot $200_1$, $200_2$, $200_n$ faces an individual to guide shopping. As the back-end equipment of the guiding shopping system 600, the workstation computer 300 stores and maintains customer message information. The guide robot $200_1$, $200_2$, $200_n$ transfers personal characteristics information associated with the customer to the workstation computer 300 via wireless communication. Having described the structure and function of a guide robot 200 and a workstation computer 300 in connection with FIGS. 2 and 3, for conciseness and clarity of presentation the structure and function of multiple guide robots $200_1$, $200_2$, $200_n$ and the workstation computer 300 will not be repeated here.

As shown in FIG. 6, the intelligent shopping guiding system 600 comprises multiple guide robots $200_1$, $200_2$, $200_n$ coupled to the workstation computer 300. Each of the guide robots $200_1$, $200_2$, $200_n$ connects to the workstation computer 300 via wireless communication, as described above in connection with FIGS. 2 and 3.

When one or more individual customers visit a store comprising the shopping guiding system 600, each of the guide robots $200_1$, $200_2$, $200_n$ is configured to capture personal characteristics information associated with each one of the customers. The guide robots $200_1$, $200_2$, $200_n$ transfer the captured personal characteristics information associated with each customer to the workstation computer 300 via wireless communication. The workstation computer 300 compares the received personal characteristics information associated with the customer to the plurality of personal characteristics information stored in the database. When the workstation computer 300 confirms that the present database does not contain matching personal characteristics information associated with the customer, the workstation computer 300 sets a new ID number associated with the personal characteristics information associated with the individual customer and builds a customer message based on the current interaction with one of the guide robots $200_1$, $200_2$, $200_n$. When the workstation computer 300 confirms that the present database contains matching personal characteristics information associated with the customer, the workstation computer 300 retrieves the customer message associated with the customer ID number. The retrieved message is analyzed by either the back office 308 staff or the workstation computer 300. The customer message is used by the guide robots $200_1$, $200_2$, $200_n$ to accomplish the shopping guiding experience.

Figure 7:
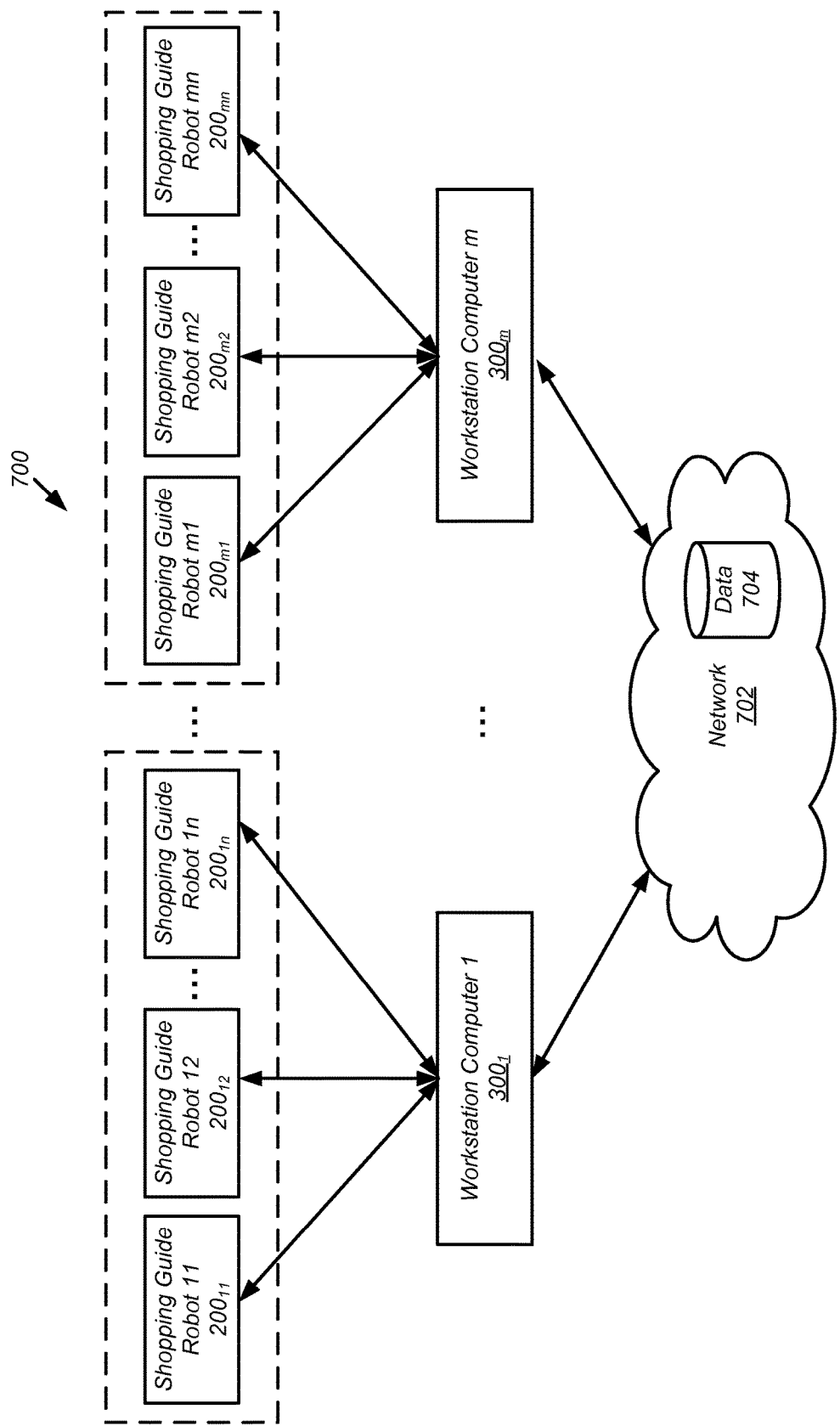
FIG. 7 is a diagram of an intelligent shopping guiding system comprising multiple guide robots coupled to multiple workstation computers, which are coupled to the cloud in accordance with one embodiment.

FIG. 7 is a diagram of an intelligent shopping guiding system 700 comprising multiple guide robots $200_{11}$-$200_{mn}$ coupled to multiple workstation computers $300_1$-$300_m$, which are coupled to a wide area network 702 such as the Internet or the cloud in accordance with one embodiment. As shown in FIG. 7, the guide robots $200_{11}$, $200_{12}$, $200_{1n}$ are coupled to a first workstation computer $300_1$ and the guide robots $200_{m1}$, $200_{m2}$, $200_{mn}$ are coupled to a second workstation computer $300_m$. Each workstation computer $300_1$, $300_m$ is coupled to the network 702.

Each workstation computer $300_1$, $300_m$ can control multiple guide robots $200_{11}$, $200_{12}$, $200_{1n}$, $200_{m1}$, $200_{m2}$, $200_{mn}$. The workstation computer $300_1$ cannot communicate with the workstation computer $300_m$ each other. But either of the workstation computer $300_1$, $300_m$ can communicate with a wide area network 702 such as the Internet or the cloud. Either of the workstation computer $300_1$, $300_m$ sends every customer's message stored in its database to the network 702. So the network 702 obtains every customer's message from the different workstation computers and forms a huge database. Guide robots controlled by the same workstation computer can be either the same type of guide robot or a different type of guide robot.

Figure 8:
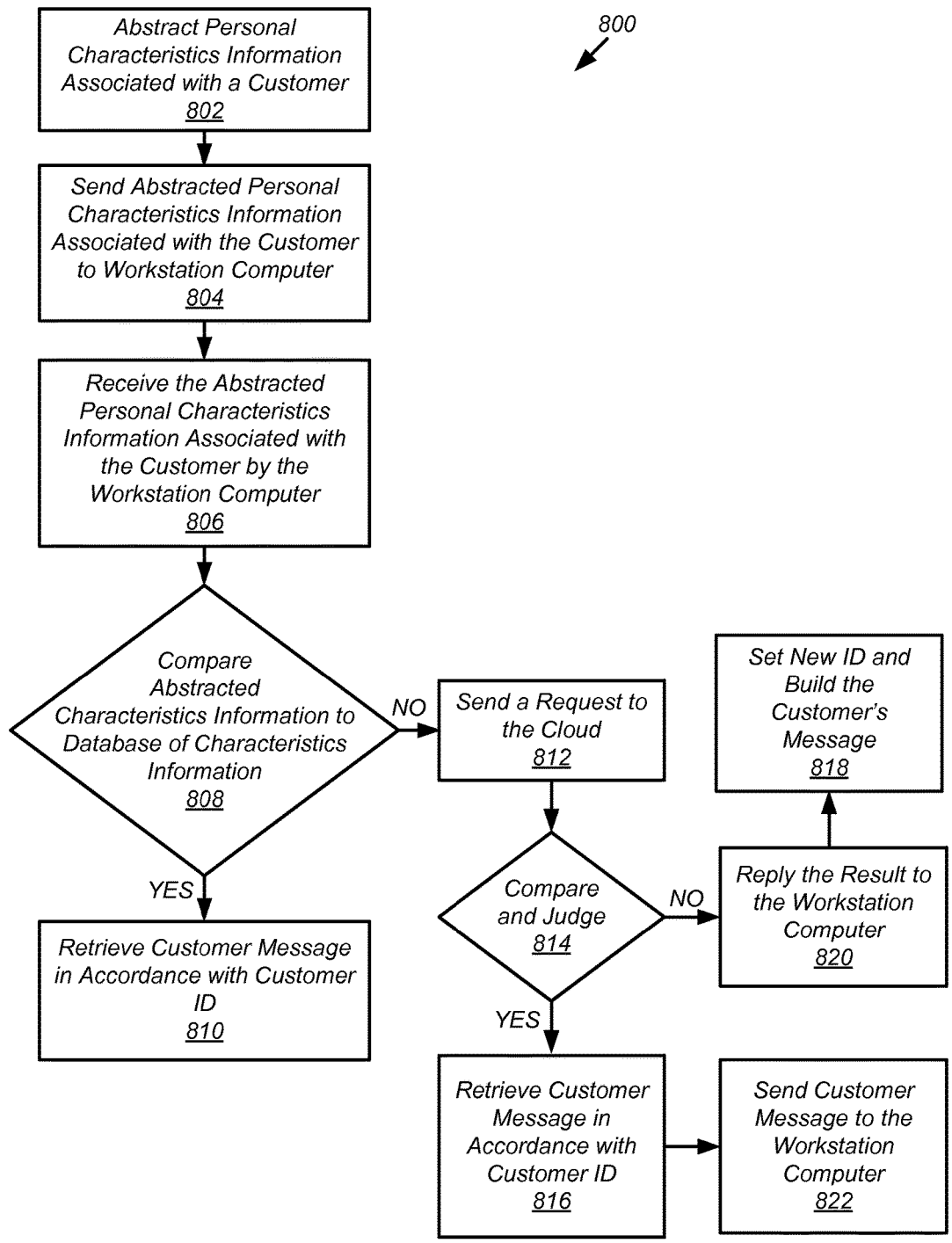
FIG. 8 is a logic diagram of a method of determining a customer characteristic in accordance with one embodiment.

FIG. 8 is a logic diagram of a method 800 of abstracting customer characteristics and comparing them in accordance with one embodiment. The process 800 illustrated in FIG. 8 is described in connection with the intelligent shopping guiding system 700 shown in FIG. 7. In reference to FIGS. 7 and 8, at 802, a guide robot $200_{11}$ abstracts personal characteristics information associated with a customer. At 804, the control unit of the guide robot $200_{11}$ controls the communication unit, as described in connection with FIG. 2, to send the abstracted personal characteristics information associated with the customer to a corresponding workstation computer $300_1$. Each workstation computer $300_1$, $300_m$ comprises an information database and a message processing unit, as previously described in connection with FIG. 3. With reference now back to FIGS. 7 and 8, at 806, the workstation computer $300_1$ receives the abstracted personal characteristics information associated with the customer from the guide robot $200_{11}$. At decision block 808, the message processing unit of the workstation computer $300_1$ compares the abstracted personal characteristics information associated with the customer with a plurality of personal characteristics information associated with a plurality of customers stored in the database.

When the workstation computer $300_1$ confirms that the present database contains matching personal characteristics information associated with the customer, the process proceeds along the YES branch. At 810, the workstation computer $300_1$ obtains the customer ID number associated with the abstracted personal characteristics information associated with the customer and retrieves a customer message associated with the customer ID number.

When the workstation computer $300_1$ confirms that the present database does not contain matching personal characteristics information associated with the customer, the process proceeds along NO branch. At 812, the workstation computer $300_1$ sends a request to the network 702 for a matching customer ID number associated with the abstracted personal characteristics information associated with the customer. In this embodiment, the network 702 is the cloud. After the cloud 702 receives this request, at decision block 814, the cloud 702 compares the abstracted personal characteristics information associated with the customer to a plurality of personal characteristics information associated with a plurality of customers stored in a remote cloud database 704.

When the cloud 702 confirms that there is no matching abstracted customer characteristic in the cloud database 704, the process proceeds along NO branch and, at 820, the cloud 702 responds to this result to the workstation computer $300_1$. At 818, the workstation computer $300_1$ assigns a new ID number associated with the abstracted personal characteristics information associated with the customer and begins building a new message file under the corresponding new customer ID number.

When the cloud 702 confirms that the database 704 contains a matching customer characteristic, the process proceeds along YES branch. At 816, the workstation computer $300_1$ obtains the customer ID number associated with the customer characteristic. The cloud 702 retrieves the customer message associated with the customer ID number. At 822, the cloud 702 sends the customer message associated with the customer ID number to the corresponding workstation computer $300_1$.

Furthermore, each workstation computer $300_1$, $300_m$ can provide the customer message of every individual in its database 308 to the cloud database 704. When the cloud 702 receives these customer message, the cloud 702 will sent the individual's updated customer message to the every workstation computer $300_1$, $300_m$, which sent this individual customer characteristics, thus this individual customer's purchasing message is plentiful.

When any workstation computer $300_1$, $300_m$ wants to determine whether this new individual customer has visited an Internet controlled shop, the corresponding workstation computer $300_1$, $300_m$ will send a request to the cloud 702. When the cloud 702 confirms that the individual customer visits the Internet controlled shop again, the cloud 702 could send this individual customer's message to the requested workstation computer $300_1$, $300_m$ by free or for a charge.

The individual's customer's ID code of the workstation computer $300_1$, $300_m$ is necessary provide a uniform rule with the cloud 702. This can avoid confusion that an individual customer has multiple customer IDs.

Figure 9:
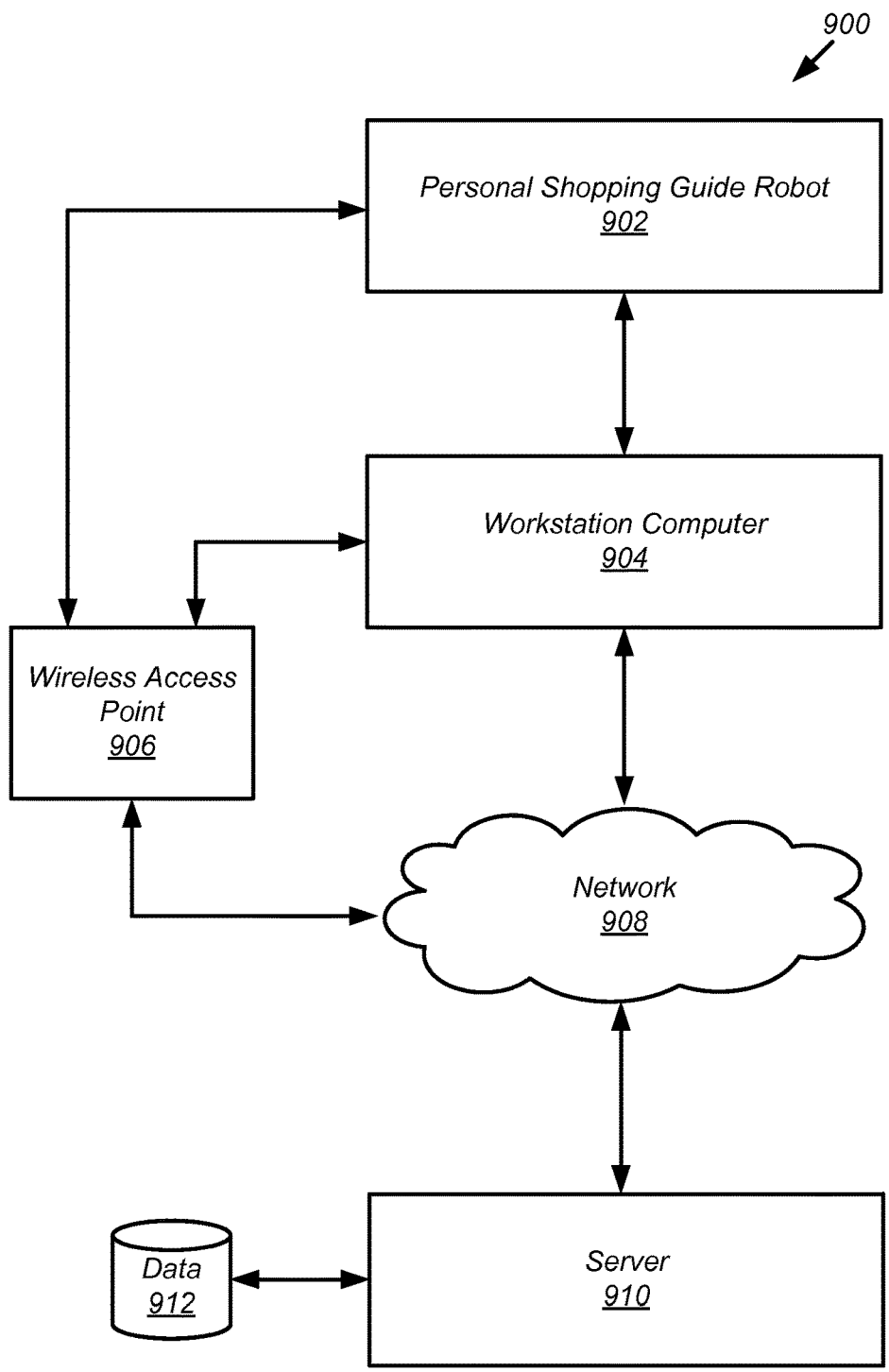
FIG. 9 is an alternative diagram of a shopping guiding system comprising a guide robot coupled to a workstation computer coupled to the cloud in accordance with one embodiment.

FIG. 9 is an alternative diagram of a shopping guiding system 900 comprising a personal shopping guide robot 902 coupled to a workstation computer 904, which is coupled to a wide area network 908 such as the cloud in accordance with one embodiment. In system 900 shown in FIG. 9, the guide robot 902 and the workstation computer 904 can communicate either wirelessly or wired. The guide robot 902 and the workstation computer 904 are coupled to a wireless access point 906, which can access the wide area network 908 (e.g., the cloud, Internet). A server 910 is coupled to the network 908 and therefore is capable of communicating directly with either the guide robot 902 or the workstation computer 908. A database 912 is coupled to the server 910 for storing personal characteristics information used to identify the customer, or establish a new customer, customer IDs associated with the personal characteristics information, and customized customer messages that contain customer preferences, shopping behavioral patterns, and the like.

Figure 10:
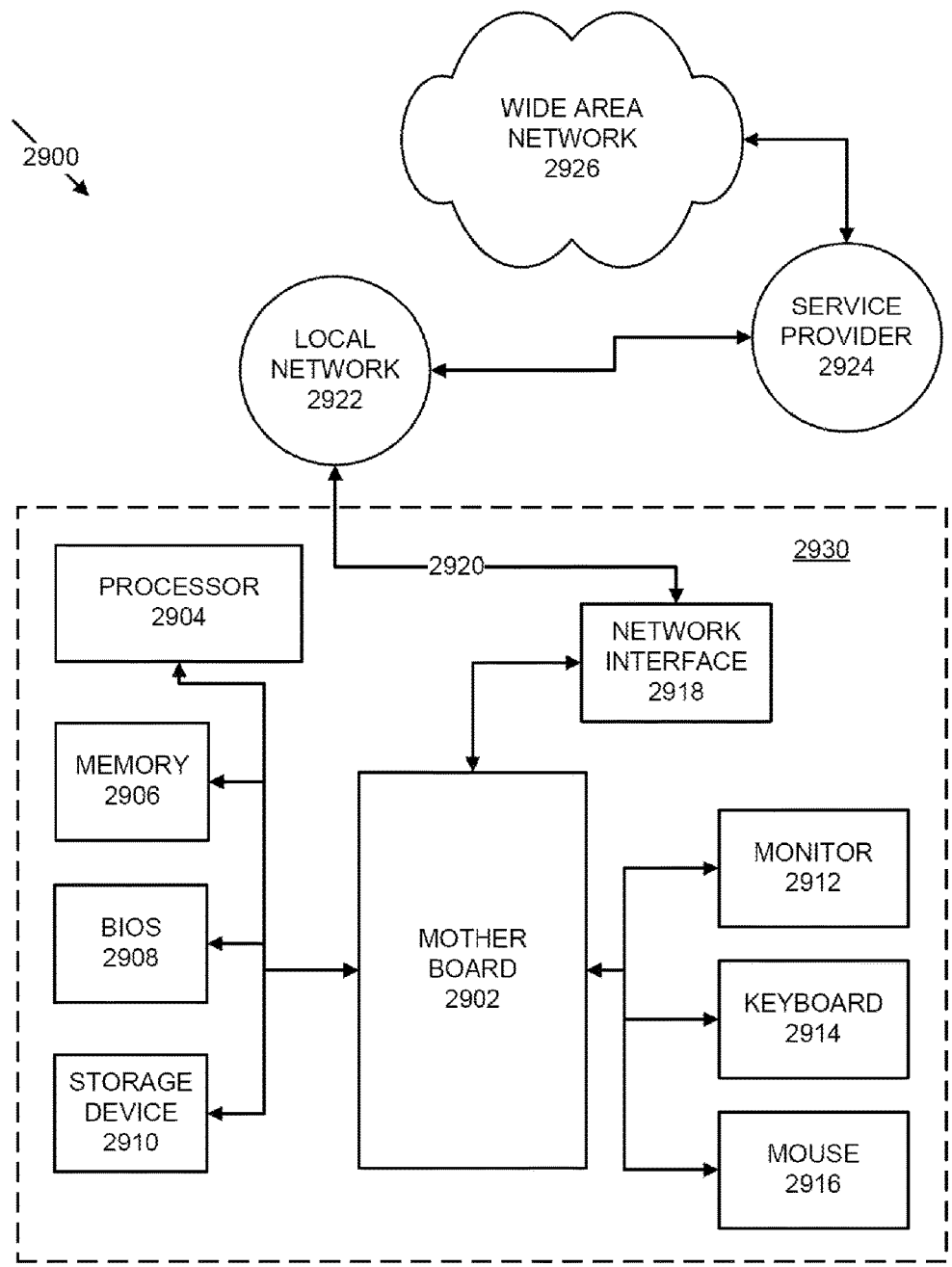
FIG. 10 is a diagram of a computer system suitable for implementing a workstation computer in accordance with one embodiment.

FIG. 10 is a diagram of a computer system 2900 suitable for implementing a workstation computer in accordance with one embodiment. The workstation computers described herein may be implemented with a general purpose computer system 2900 upon which one aspect of a computer-implemented method may be implemented. The computer system 2900 includes a motherboard 2902 or other communication mechanism for communicating information, and a processor 2904 coupled to the motherboard 2902 for processing information. The computer system 2900 also includes a memory 2906, such as a random access memory (RAM) or other dynamic storage device, coupled to motherboard 2902 for storing information and instructions to be executed by the processor 2904. The memory 2906 also may be used for storing temporary variables or other intermediate information during execution of instructions to be executed by processor 2904. The computer system 2900 further includes a basic input output system (BIOS) 2908 or other static storage device coupled to motherboard 2902 for storing static information and instructions for processor 2904. A storage device 2910, such as a magnetic disk or optical disk, is provided and coupled to bus 2902 for storing information and instructions.

The computer system 2900 may be coupled via the motherboard 2902 to a monitor 2912, such as a cathode ray tube (CRT) or liquid crystal display (LCD) for displaying information to a computer user. The computer system 2900 may be coupled via the motherboard 2902 to a multimedia device to control a combination of text, audio, still images, animation, video, and interactivity content forms. The motherboard 2902 may be coupled to at least one speaker for communicating audio information to the user. A keyboard 2914, including alphanumeric and other keys is coupled to the motherboard 2902 for communicating information and command selections to the processor 2904. Another type of user input device is a mouse 2916, such as a mouse, a trackball, or cursor direction keys for communicating direction information and command selections to the processor 2904 and for controlling cursor movement on the monitor 2912. This input device typically has degrees of freedom in two axes, a first axis (e.g., x) and a second axis (e.g., y), that allows the device to specify positions in a plane.

The computer system 2900 may be a conduit for information transmission with a server 2930. Such information may, by way of example, include information regarding the selection of specific digital content to be purchased, payment information, delivery information or other information necessary to successfully perform the transaction. According to one embodiment, the information is provided by the computer system 2900 in response to the processor 2904 executing one or more sequences of one or more instructions contained in the memory 2906. Such instructions may be read into the memory 2906 from another computer-readable medium, such as storage device 2910.

Execution of the sequences of instructions contained in the memory 2906 causes the processor 2904 to perform the process steps described herein. One or more processors in a multi-processing arrangement may also be employed to execute the sequences of instructions contained in the memory 2906. In alternative embodiments, hard-wired circuitry may be used in place of or in combination with software instructions. Thus, the embodiments are not limited to any specific combination of hardware circuitry and software.

The term "computer-readable medium" as used herein refers to any medium that participates in providing instructions to the processor 2904 for execution. Such a medium may take many forms, including but not limited to, non-volatile media, volatile media, and transmission media. Non-volatile media includes, for example, optical or magnetic disks, such as a storage device 2910. Volatile media includes dynamic memory, such as the memory 2906. The transmission media includes coaxial cables, copper wire, and fiber optics, including the wires that comprise the motherboard 2902. The transmission media also can take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to the processor 2904 for execution. For example, the instructions may initially be carried on a magnetic disk of a remote computer. The motherboard 2902 carries the data to and from the memory 2906, from which the processor 2904 retrieves and executes the instructions. The instructions received by the memory 2906 may optionally be stored on storage device 2910 either before or after execution by the processor 2904.

The computer system 2900 also includes a network interface 2918 coupled to the motherboard 2902. The network interface 2918 provides a two-way data communication coupling to a network link 2920 that is connected to a local network 2922. For example, the network interface 2918 may be a digital subscriber line (DSL) modem, satellite dish, an integrated services digital network (ISDN) card or other data communication connection to a corresponding type of telephone line. As another example, the communication interface 2918 may be a local area network (LAN) card effecting a data communication connection to a compatible LAN. Wireless communication means such as internal or external wireless modems may also be implemented.

In any such implementation, the network interface 2918 sends and receives electrical, electromagnetic or optical signals that carry digital data streams representing various types of information, such as the selection of goods to be purchased, the information for payment of the purchase, or the address for delivery of the goods. The network link 2920 typically provides data communication through one or more networks to other data devices. For example, the network link 2920 may effect a connection through the local network 2922 to an Internet Host Provider (ISP) 2924 or to data equipment operated by ISP 2924. The ISP 2924 in turn provides data communication services through the world wide packet data communication network now commonly referred to as the "Internet" 2926. The local network 2922 and the Internet 2926 both use electrical, electromagnetic or optical signals that carry digital data streams. The signals through the various networks and the signals on the network link 2920 and through the network interface 2918, which carry the digital data to and from the computer system 2900, are exemplary forms of carrier waves transporting the information.

The computer system 2900 can send messages and receive data, including program code, through the network (s), the network link 2920, and the network interface 2918. In the Internet example, a server 2928 might transmit a requested code for an application program through the Internet 2926, ISP 2924, the local network 2922 and the network interface 2918. In accordance with one embodiment, one such downloaded application provides for the selection, transaction, payment and delivery of goods as described herein. The received code may be executed by the processor 2904 as it is received, and/or stored in the storage device 2910, or other non-volatile storage for later execution. In this manner, the computer system 2900 may obtain application code in the form of a carrier wave.

As discussed above, the computer system 2900 also comprises wireless radio communications functionality to facilitate both local and wide area network (WAN) connectivity between the guide robot 200, the workstation computer 300, other guide robots, other workstation computers, and remote databases for example.

Having shown and described various embodiments of the present invention, further adaptations of the methods and systems described herein may be accomplished by appropriate modifications by one of ordinary skill in the art without departing from the scope of the present invention. Several of such potential modifications have been mentioned, and others will be apparent to those skilled in the art. For instance, the examples, embodiments, geometries, materials, dimensions, ratios, steps, and the like discussed above are illustrative and are not required. Accordingly, the scope of the present invention should be considered in terms of the following claims and is understood not to be limited to the details of structure and operation shown and described in the specification and drawings.

While various details have been set forth in the foregoing description, it will be appreciated that the various aspects of the autonomous planar surface cleaning robots may be practiced without these specific details. For example, for conciseness and clarity selected aspects have been shown in block diagram form rather than in detail. Some portions of the detailed descriptions provided herein may be presented in terms of instructions that operate on data that is stored in a computer memory. Such descriptions and representations are used by those skilled in the art to describe and convey the substance of their work to others skilled in the art. In general, an algorithm refers to a self-consistent sequence of steps leading to a desired result, where a "step" refers to a manipulation of physical quantities which may, though need not necessarily, take the form of electrical or magnetic signals capable of being stored, transferred, combined, compared, and otherwise manipulated. It is common usage to refer to these signals as bits, values, elements, symbols, characters, terms, numbers, or the like. These and similar terms may be associated with the appropriate physical quantities and are merely convenient labels applied to these quantities.

Unless specifically stated otherwise as apparent from the foregoing discussion, it is appreciated that, throughout the foregoing description, discussions using terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

It is worthy to note that any reference to "one aspect," "an aspect," "one embodiment," or "an embodiment" means that a particular feature, structure, or characteristic described in connection with the aspect is included in at least one aspect. Thus, appearances of the phrases "in one aspect," "in an aspect," "in one embodiment," or "in an embodiment" in various places throughout the specification are not necessarily all referring to the same aspect. Furthermore, the particular features, structures or characteristics may be combined in any suitable manner in one or more aspects.

Although various embodiments have been described herein, many modifications, variations, substitutions, changes, and equivalents to those embodiments may be implemented and will occur to those skilled in the art. Also, where materials are disclosed for certain components, other materials may be used. It is therefore to be understood that the foregoing description and the appended claims are intended to cover all such modifications and variations as falling within the scope of the disclosed embodiments. The following claims are intended to cover all such modification and variations.

Some or all of the embodiments described herein may generally comprise technologies for autonomous cleaning robots or otherwise according to technologies described herein. In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. Those skilled in the art will recognize, however, that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

All of the above-mentioned U.S. patents, U.S. patent application publications, U.S. patent applications, foreign patents, foreign patent applications, non-patent publications referred to in this specification and/or listed in any Application Data Sheet, or any other disclosure material are incorporated herein by reference, to the extent not inconsistent herewith. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

Some aspects may be described using the expression "coupled" and "connected" along with their derivatives. It should be understood that these terms are not intended as synonyms for each other. For example, some aspects may be described using the term "connected" to indicate that two or more elements are in direct physical or electrical contact with each other. In another example, some aspects may be described using the term "coupled" to indicate that two or more elements are in direct physical or electrical contact. The term "coupled," however, also may mean that two or more elements are not in direct contact with each other, but yet still co-operate or interact with each other.

In some instances, one or more components may be referred to herein as "configured to," "configurable to," "operable/operative to," "adapted/adaptable," "able to," "conformable/conformed to," etc. Those skilled in the art will recognize that "configured to" can generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

In certain cases, use of a system or method may occur in a territory even if components are located outside the territory. For example, in a distributed computing context, use of a distributed computing system may occur in a territory even though parts of the system may be located outside of the territory (e.g., relay, server, processor, signal-bearing medium, transmitting computer, receiving computer, etc. located outside the territory).

A sale of a system or method may likewise occur in a territory even if components of the system or method are located and/or used outside the territory. Further, implementation of at least part of a system for performing a method in one territory does not preclude use of the system in another territory.

Although various embodiments have been described herein, many modifications, variations, substitutions, changes, and equivalents to those embodiments may be implemented and will occur to those skilled in the art. Also, where materials are disclosed for certain components, other materials may be used. It is therefore to be understood that the foregoing description and the appended claims are intended to cover all such modifications and variations as falling within the scope of the disclosed embodiments. The following claims are intended to cover all such modification and variations.

In summary, numerous benefits have been described which result from employing the concepts described herein. The foregoing description of the one or more embodiments has been presented for purposes of illustration and description. It is not intended to be exhaustive or limiting to the precise form disclosed. Modifications or variations are possible in light of the above teachings. The one or more embodiments were chosen and described in order to illustrate principles and practical application to thereby enable one of ordinary skill in the art to utilize the various embodiments and with various modifications as are suited to the particular use contemplated. It is intended that the claims submitted herewith define the overall scope.

Various aspects of the subject matter described herein are set out in the following numbered clauses:

1. A method of guiding shopping by a guide robot, the method comprising: abstracting, by an individual personal characteristic unit of a guide robot, personal characteristics information associated with a customer; sending, by a communication unit of the guide robot, the abstracted personal characteristics information associated with the customer to a remote workstation computer; receiving, by the communication unit of the guide robot, a customized message associated with the customer from the remote workstation computer; and presenting, by a user interface of the guide robot, the customized message to the customer.

2. The method of clause 1, wherein abstracting the personal characteristics information associated with the customer comprises capturing one or more biometric samples associated with the customer.

3. The method of clause 2, wherein the biometric samples are captured in any one of the following methods: receiving an image sample of the customer from an image acquisition system of the guide robot, receiving a voice sample of the customer from a voice recognition system of the guide robot, receiving an iris sample of the customer from an iris detection system of the guide robot, and receiving a fingerprint sample of the customer from a fingerprint recognition system, and any combination thereof.

4. The method of clause 1, wherein sending and receiving information to and from the remote workstation computer comprises sending and receiving the information by a wireless communication unit of the guide robot.

5. The method of clause 1, wherein the customized message is presented to the customer in any one of the following methods: presenting text or graphics via a video screen display, or presenting audio by an audio device, and any combination thereof.

6. A method of guiding shopping by a workstation computer, the method comprising: receiving, by a communication unit of a workstation computer, abstracted personal characteristics information from a remote guide robot; and comparing, by a message processing unit of the workstation computer, the received abstracted personal characteristics information to a plurality of personal characteristics information stored in a database coupled to the workstation computer; wherein when there is matching personal characteristics information stored in the database, retrieving a customer message associated with a customer identification number from the database.

7. The method of clause 6, further comprising analyzing, by a message processing unit, the customer message.

8. The method of clause 7, further comprising controlling the guide robot to accomplish the shopping guiding.

9. The method of clause 8, further comprising updating the status of the customer message.

10. The method of clause 6, wherein when there is no matching personal characteristics information in the database, setting, by the message processing unit, a new identification number for the customer and building a customer message.

11. The method of clause 6, wherein when there is no matching personal characteristics information in the database, sending, by the communication unit, a request to a remote network computer coupled to a database for a matching customer identification number associated with the abstracted personal characteristics information associated with the customer.

12. The method of clause 11, comprising comparing, by the remote network computer, the abstracted personal characteristics information associated with the customer to a plurality of personal characteristics information associated with a plurality of customers stored in the remote database.

13. The method of clause 12, wherein when there is matching personal characteristics information in the remote database, retrieving a customer message associated with a customer identification number from the remote database.

14. The method of clause 13, comprising sending, by the communication unit, the customer message to the workstation computer.

15. The method of clause 12, wherein when there is no matching personal characteristics information in the remote database, replying the result to the workstation computer.

16. The method of clause 15, comprising setting, by the message processing unit, a new identification number for the customer and building a customer message.

17. A guide robot for a shopping guiding system, the robot comprising: a control unit; an individual personal characteristic unit coupled to the control unit, the individual personal characteristic unit configured to abstract personal characteristics information associated with a customer; a communication unit coupled to the control unit, the communication unit configured to send the abstracted personal characteristics information associated with the customer to a remote workstation computer and to receive a customized message associated with the customer from the remote workstation computer; and a user interface coupled to the control unit, the user interface configured to present the customized message to the customer.

18. The guide robot of clause 17, wherein the individual personal characteristics abstracting unit is configured to capture one or more biometric samples associated with the customer.

19. The guide robot of clause 18, further comprising any one of the following devices to capture the biometric samples: an image acquisition system configured to acquire an image sample of the customer, a voice recognition system of the guide robot configured to recognize a voice sample of the customer, an iris detection system configured to detect an iris sample of the customer, and a fingerprint recognition system configured to recognize a fingerprint of the customer, and any combination thereof.

20. The guide robot of clause 17, comprising a wireless communication unit couple to the control unit, the wireless communication unit configured to send and receive information to and from the remote workstation computer.

21. The guide robot of clause 17, one or more of the following devices configured to present the customized message to the customer: a video screen display configured to present text or graphics, or an audio device configured to present audio, and any combination thereof.

22. A workstation computer for a shopping guiding system, the workstation computer comprising: a communication unit configured to receive an abstracted personal characteristics information from a remote guide robot; a database; and a message processing unit coupled to the communication unit, the message processing unit configured to compare the received abstracted personal characteristics information to a plurality of personal characteristics information stored in the database; wherein the message processing unit is configured to retrieve a customer message associated with a customer identification number from the database when there is matching personal characteristics information stored in the database.

23. The workstation computer of clause 22, wherein the message processing unit is configured to analyze the customer message.

24. The workstation computer of clause 22, wherein the message processing unit is configured to set a new identification number for the customer and build a customer message when there is no matching personal characteristics information in the database.

25. A shopping guiding system comprising: a first workstation computer comprising: a first communication unit configured to receive an abstracted personal characteristics information from a remote guide robot; a first database; and a first message processing unit coupled to the first communication unit, the first message processing unit configured to compare the received abstracted personal characteristics information to a plurality of personal characteristics information stored in the first database; wherein the first message processing unit is configured to retrieve a customer message associated with a customer identification number from the first database when there is matching personal characteristics information stored in the first database; and wherein the first workstation computer communicates with a network.

26. The system of clause 25, wherein the first communication unit is configured to send a request to the network for a matching customer identification number associated with the abstracted personal characteristics information associated with the customer when there is no matching personal characteristics information in the first database of the first workstation computer.

27. The system of clause 26, wherein the network is configured to compare the abstracted personal characteristics information associated with the customer to a plurality of personal characteristics information associated with a plurality of customers stored in a cloud database.

28. The system of clause 27, wherein the network retrieves a customer message associated with a customer identification number from the cloud database when there is matching personal characteristics information in the cloud database.

29. The system of clause 28, wherein the network sends the customer message to the first workstation computer.

30. The system of clause 25, wherein the network replies the result to the first workstation computer when there is no matching personal characteristics information in the cloud database.

31. The system of clause 30, wherein the first workstation computer is configured to set a new identification number for the customer and build a customer message when the reply of no matching personal characteristics information in the cloud database is received form the network.

32. The system of clause 25, the shopping guiding system further comprising a second workstation computer, wherein the second workstation computer comprises: a second communication unit configured to receive abstracted personal characteristics information from the remote guide robot; a second database; and a second message processing unit coupled to the second communication unit, the second message processing unit configured to compare the received abstracted personal characteristics information to a plurality of personal characteristics information stored in the second database; wherein the second message processing unit is configured to retrieve a customer message associated with a customer identification number from the second database when there is matching personal characteristics information stored in the second database; and wherein the second workstation computer communicates with a network.

33. The system of clause 32, wherein the second communication unit is configured to send a request to the network for a matching customer identification number associated with the abstracted personal characteristics information associated with the customer when there is no matching personal characteristics information in the second database of the second workstation computer.

34. The system of clause 33, wherein the network is configured to compare the abstracted personal characteristics information associated with the customer to a plurality of personal characteristics information associated with a plurality of customers stored in a cloud database; the network retrieves a customer message associated with a customer identification number from the cloud database when there is matching personal characteristics information in the cloud database; the network sends the customer message to the second workstation computer.

35. The system of clause 32, wherein the network replies the result to the second workstation computer when there is no matching personal characteristics information in the cloud database.

36. The system of clause 35, wherein the second workstation computer is configured to set a new identification number for the customer and build a customer message when the reply of no matching personal characteristics information in the cloud database is received form the network.

The invention claimed is:

1. A guide robot for a shopping guiding system, wherein the guide robot comprises:
    a control unit comprising a processor configured to execute operating logic;
    at least one biometric system coupled to the control unit, wherein each of the at least one biometric system comprises a sensor configured to capture personal characteristic information including a biometric identifier associated with a customer;
    a communication interface coupled to the control unit, wherein the communication interface is configured to:
        send the biometric identifier associated with the customer to a remote workstation computer, wherein the remote workstation computer retrieves a message file based on the biometric identifier and generates instructions configured to control the guide robot based on the message file, wherein the remote workstation computer retrieves the message file from its database if a match of the biometric identifier exists in its database, and wherein the remote workstation computer retrieves the message file from a cloud-based database that stores a message file associated with the customer if a match of the biometric identifier does not exist in its database; and
        receive the instructions generated by the remote workstation computer; and
    a user interface coupled to the control unit, wherein the user interface comprises:
        an audio interface to communicate with the customer, wherein the audio interface comprises a microphone to receive audio input from the customer and a speaker to provide audio output to the customer; and
        a video interface to communicate with the customer, wherein the video interface comprises a touchscreen to receive touch input from the customer and to provide visual output and tactile feedback to the customer; and
    a self-moving unit;
    wherein, in response to the instructions generated by the remote workstation computer, the operating logic is configured to control operation of the user interface by communicating a customized message to the customer and to control operation of the self-moving unit.

2. The guide robot of claim 1, wherein the communication interface comprises a wireless communication interface.

3. The guide robot of claim 1, wherein the visual output comprises at least one of textual or graphical information.

4. The guide robot of claim 1, wherein the at least one biometric system comprises an image acquisition system including an image sensor configured to capture a facial image to identify the customer based on the facial image.

5. The guide robot of claim 4, wherein the image sensor comprises a charge coupled device based image sensor.

6. The guide robot of claim 4, wherein the at least one biometric system further comprises one or more than one of:

a voice recognition system comprising a sensor configured to capture a voice sample as the biometric identifier to recognize the customer based on the voice sample;

an iris detection system comprising a sensor configured to capture an iris sample as the biometric identifier to distinguish the customer based on the iris sample; and a fingerprint recognition system comprising a sensor configured to capture a fingerprint as the biometric identifier to recognize the customer based on the fingerprint.

7. The guide robot of claim 1, wherein the self-moving unit is coupled to at least one sensor, wherein the at least one sensor comprises a cliff sensor, an obstacle sensor, or a combination thereof.

8. The guide robot of claim 1, wherein the biometric identifier includes at least one of a physiological characteristic or a behavioral characteristic.

9. The guide robot of claim 8, wherein the physiological characteristic comprises a heart rate, a heart rate variability, a respiration rate, a body temperature, or a three-axis measurement of activity and torso angle associated with the customer.

10. The guide robot of claim 8, wherein the behavioral characteristic comprises a pattern of behavior including a typing rhythm or a gait associated with the customer.

11. The guide robot of claim 1, wherein the biometric identifier comprises physiologic data captured by the sensor of the at least one biometric system.

12. The guide robot of claim 1, wherein the operating logic is configured to control operation of the user interface to communicate shopping assistance information based on at least one of the customer's interests, purchasing records, behaviors, tendencies, inquiries, or preferences stored in the message file of the customer.

13. The guide robot of claim 12, wherein the operating logic is configured to control operation of the user interface to communicate information about at least one of goods or services of interest to the customer.

14. The guide robot of claim 12, wherein the operating logic is configured to control operation of the user interface to communicate an answer to an inquiry of the customer.

15. The guide robot of claim 1, wherein the communication interface is further configured to send interaction information to the remote workstation computer, wherein the interaction information comprises at least one of new inquiries or new interests of the customer, and wherein the remote workstation computer updates the message file of the customer based on the interaction information.

16. The guide robot of claim 15, wherein the remote workstation computer updates the message file of the customer based on the interaction information during the communicating of the customized message.

17. The guide robot of claim 1, wherein the message file stored at the cloud-based database has been received from one of a plurality of other remote workstation computers coupled to a same network as the remote workstation computer.

* * * * *